V. G. APPLE.
MOLDING PRESS.
APPLICATION FILED APR. 14, 1920.

1,402,705.

Patented Jan. 3, 1922.

2 SHEETS—SHEET 1.

Inventor
Vincent G. Apple,
By Howard L. Smith.
His Attorney

Witness
N. L. Rogers

V. G. APPLE.
MOLDING PRESS.
APPLICATION FILED APR. 14, 1920.
1,402,705.
Patented Jan. 3, 1922.
2 SHEETS—SHEET 2.
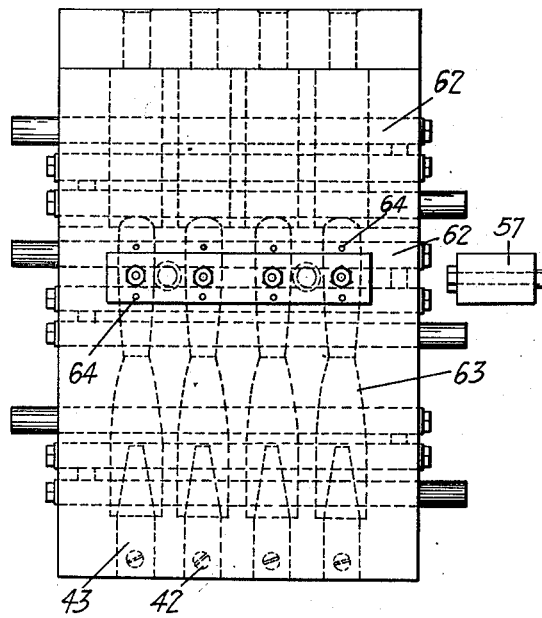
Fig. 3
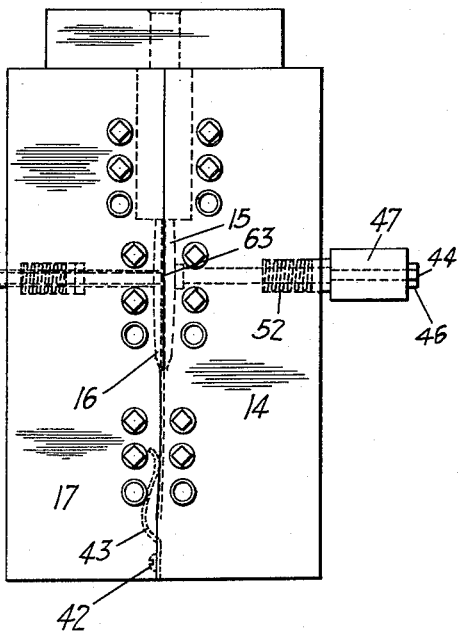
Fig. 5
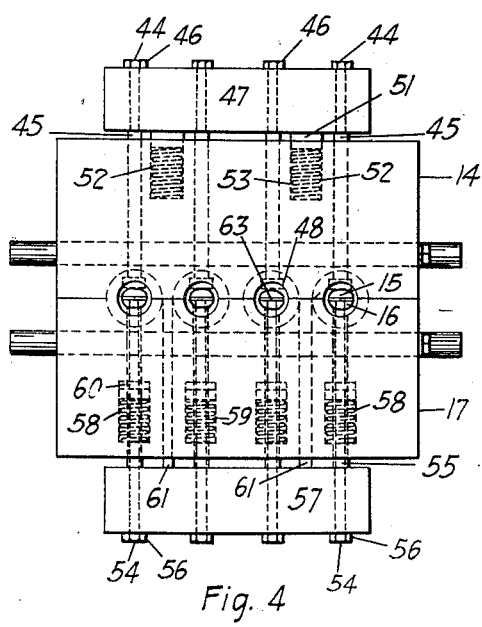
Fig. 4
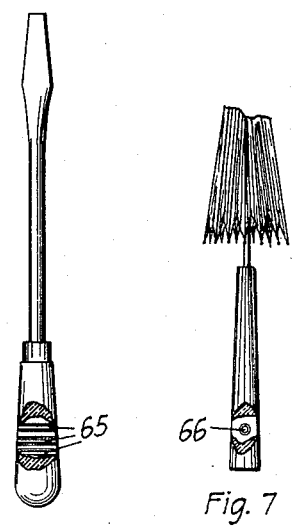
Fig. 6
Fig. 7
Witness
H. L. Rogers
Inventor,
Vincent G. Apple,
By Howard S. Smith,
Attorney

UNITED STATES PATENT OFFICE.

VINCENT G. APPLE, OF DAYTON, OHIO.

MOLDING PRESS.

1,402,705.  Specification of Letters Patent.  Patented Jan. 3, 1922.

Application filed April 14, 1920. Serial No. 373,756.

*To all whom it may concern:*

Be it known that I, VINCENT G. APPLE, a citizen of the United States, residing in the city of Dayton, in the county of Montgomery and State of Ohio, have invented certain new and useful Improvements in Molding Presses, of which the following is a specification.

The principal object of my invention is to provide a split-die plastic mold into which the inserts may be readily introduced, and from which they may be easily removed.

The invention embodies a pincher type of molding press wherein one half of the die has a circumferential or other movement away from the other half, to bring it to an angular position with reference to the latter. This permits articles to be inserted in, and removed from, the movable part of the die without the necessity and inconvenience of leaning over it from a side position. Instead, the movable part of the die is brought to a position immediately in front of the operator, whereby he may insert the articles in, and withdraw them from, the movable die-part as readily as he could place those articles in, or remove them from, a mold upon a table in front of him.

The extreme accessibility of my improved molding press makes it admirably adapted for molding handles and other parts upon articles from phenolic condensation products, as well as for performing other molding operations involving the use of those products and other plastic materials.

It is another object of my invention to provide suitable power-driven means for forcing the movable die-part into engagement with, and away from, the stationary die-part, as well as for forcibly pressing the core into the closed mold.

It is still another object of my invention to provide means for automatically knocking the molded articles out of the movable die-part after the molding operation is completed.

Other important and incidental objects will be brought out in the following specification and particularly set forth in the subjoined claims.

Figure 2:
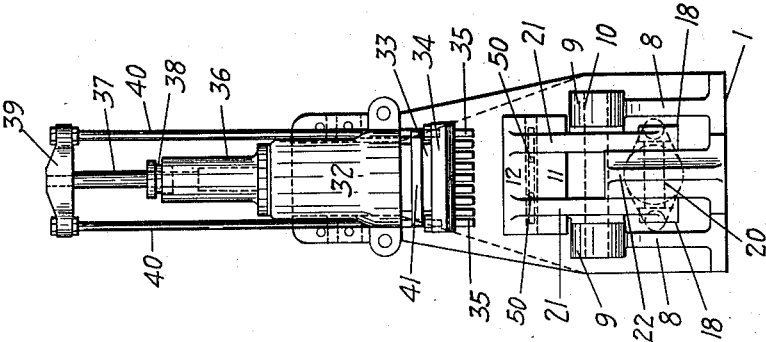
Figure 1:
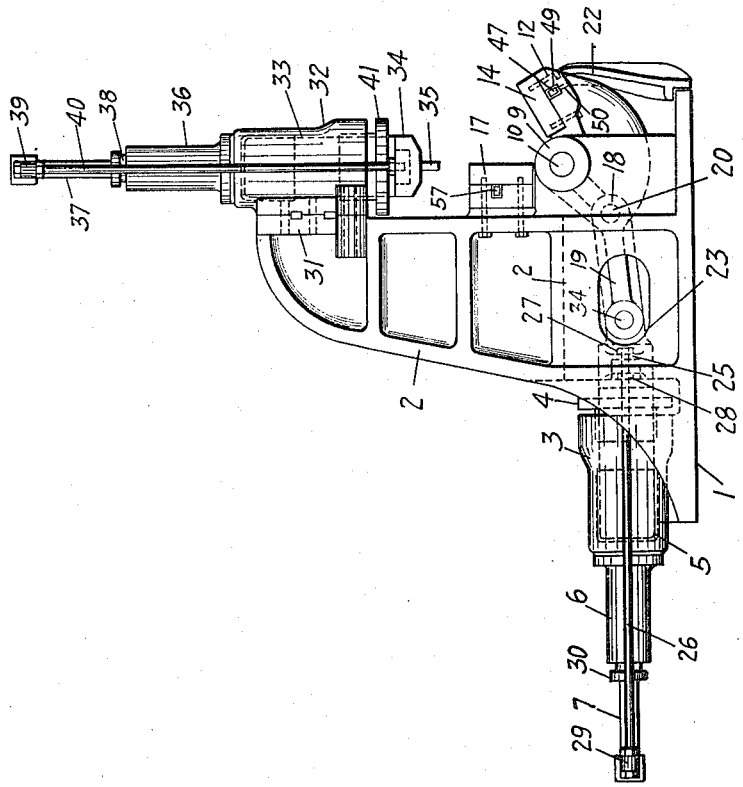

In the accompanying drawings, Figure 1 is a side elevation of the molding press, showing the movable mold-part or die in its inclined position to receive the articles upon which something is to be molded. Figure 2 is an end elevational view of the molding press. Figure 3 is a rear side view of the die-parts in their closed position, showing a number of putty knives in the cavities between them. Figure 4 is a top plan view thereof. Figure 5 is an end view of the same. Figure 6 is a side view of a screw driver upon which a handle has been molded. And Figure 7 is a side view of an umbrella handle upon which a handle has been impressed.

Throughout the specification and drawings, similar reference characters denote corresponding parts.

Referring to the accompanying drawings, the numeral 1 designates a horizontal bed from which a column 2 is projected upwardly. Supported upon this bed 1 at the rear of the base portion of the column 2, is a hydraulic cylinder 3 whose enlarged front end receives a gland 4 through which there projects from the cylinder, a plunger 5. Suitably secured to the rear portion of the cylinder 3 is an elongated cylinder 6 for a return plunger 7. (See Figure 1.)

Projecting upwardly from the front end of the bed 1 are brackets 8, 8, each of which has formed on its upper end a boss 9 to receive a transverse shaft 10. Pivotally supported by the latter is a jaw casting 11 through a bore in the rear portion of which the shaft 10 loosely projects. At its upper end the casting 11 terminates in a jaw 12 to which is suitably secured a die-part 14 provided with half-cavities 15 that are complemental with half-cavities 16 formed in a stationary die-part 17 secured to the column 2 above the brackets 8, 8.

At its lower end the casting 11 terminates in two downwardly projecting boss portions 18, 18 between which sufficient space is left to receive one end of a connecting rod 19 through which and the bosses a wrist pin 20 projects. Projecting upwardly from each boss 18 to the top portion of the jaw 12 is a curved rib 21. (See Figures 1 and 2.)

The die-part 14 is prevented from descending below a certain point during its circumferential movement, by an upright brace 22 which is suitably secured to the front end of the bed 1. The upper end of this brace 22 is in the path of downward movement of the jaw 12, which, upon striking the brace, is firmly held by the latter in the inclined position shown in Figure 1. This position of the die-part permits the ready insertion of knives and other articles in its half-cavities before it is moved upwardly into engagement with its complemental die-part 17 by the plunger means now more fully to be described.

At its extreme front end the plunger 5 terminates in a reduced extension 23 to which there is secured, by means of a wrist pin 24, the front end of the connecting rod 19. Formed on each side of the plunger 5 at its front end is an ear 25 through which projects the front end of a draw rod 26 and to which it is firmly secured by nuts 27 and 28. The rear end of each draw rod 26 is connected to a transverse member 29 secured to the outer end of the plunger 7 beyond a gland 30 through which the said plunger enters the cylinder.

When the plunger 5 is moved forwardly by the water pressure behind it, the connecting rod 19 will exert the force imparted to it by the plunger, upon the lower end of the casting 11 to cause its upper end to move the die-part 14 secured to its jaw 12, into engagement with the die-part 17. After the molding operation is completed, the water pressure is then applied to the plunger 7, which returns the die-part 14 to its normal inclined position through the pull exerted by the draw rods 26, 26 upon the plunger 5.

For the purpose of packing the material forcibly into the mold cavities after the die-part 14 is in engagement with the die-part 17, the following device is provided. Suitably secured to a support 31 at the top of the column 2, is a vertically-disposed cylinder 32. Movable in this cylinder is a plunger 33 which terminates at its lower end in a head 34 that carries a series of cores 35, each one of which is adapted to enter the mouth of a mold cavity to compress the material therein forcibly around the article which it contains, when water pressure is exerted behind the plunger.

For the purpose of withdrawing the cores 35 from the mold cavities, the following means are provided. Projecting upwardly from the cylinder 32 is an elongated cylinder 36. Vertically movable within the latter is a plunger 37 that passes through a gland 38 and to whose upper end there is secured a transverse member 39. The outer ends of the latter are connected by draw rods 40, 40 to the core-carrying head 34. When water pressure is exerted against the plunger 37, the rods 40, 40 will draw this head upwardly to withdraw the cores 35 from the mold cavities formed between the engaging die-parts 14 and 17. In the lower end of the cylinder 32 a gland 41 is provided to seal it against leakage when water pressure is exerted against the plunger 33 to force the cores 35 into the mold cavities. (See Figures 1 and 2.)

The following means may be provided for holding the articles within the movable die-part 14 when the latter is raised. Referring to Figures 3 and 5, there is secured, by means of screws 42, to the face portion of the movable die-part 14 below the cavities 15, retaining springs 43 which tightly engage the lower ends of the articles within those cavities to hold them in place during the upward movement of that die-part. The heads of the screws, and the springs, enter recesses provided to receive them in the complemental die-part 17 so that they will not interfere with a close engagement between said die-parts. While I have shown this form of means for holding the articles within the die-part 14 during its upward movement, any other means may be employed for this purpose without departing from the spirit of the invention.

The means I prefer to employ for knocking the articles out of the molds after handles or other parts have been formed upon them, will now be specifically described. Referring to Figure 4, there project outwardly from a series of holes formed in the movable die-part 14, plungers 44 that carry on their outer ends between shoulders 45 and nuts 46, a transverse bar 47. Each plunger 44 has a head 48 that is adapted to be forced through its respective hole into a cavity 15 to dislodge the molded articles therefrom by the following means.

Referring to Figure 1, the bar 47 is movable sidewise within a recess 49 provided in the jaw 12 of the casting 11. Entering this recess from behind are two knock-out pins 50, 50 which project outwardly a short distance beyond the rear portion of the jaw 12. When the die-part 14 containing the molded articles has about reached the limit of its downward movement, the knock-out pins 50, 50 will engage the upper end of the upright brace 22 and be forced inwardly by it to impart a similar movement to the bar 47. The latter in turn will force the plungers 44 inwardly a sufficient distance to cause their heads 48 to enter the cavities 15 and dislodge therefrom the molded articles. The plungers are withdrawn from the cavities by the pressure which is exerted upon projections 51 on the bar 47 by coil springs 52 positioned within recesses 53 provided in the die-part 14. (See Figures 4 and 5.)

The following means are provided to dislodge the molded articles from the complemental cavities 16 within the stationary die-part 17, so that they may be carried downwardly by the die-part 14 to be knocked out of the latter by the means above described. Referring to Figures 4 and 5, there project outwardly from a series of holes formed in the stationary die 17, plungers 54 which carry on their outer ends between shoulders 55 and nuts 56, a transverse bar 57 similar to the bar 47. The front ends of the plungers 54 are adapted to be pressed into the cavities 16 by coil springs 58 mounted in recesses 59 within the die-part 17 between the outer walls of the recesses and shoulders 60 formed on said plungers. When the movable die-part approaches the stationary die-part 17, it first engages pins 61 that project inwardly from the bar 57 through holes in said die-part 17. The bar is thus moved rearwardly by the movable die-part 14 to withdraw the inner ends of the plungers 54 from the cavities 16 against the compression of the springs 58 to permit those cavities, together with their complemental ones 15, to be completely filled with the molding material. After the molding operation is completed and the movable die-part 14 starts to descend, the springs 58 are free to force the plungers 54 into the cavities 16 to dislodge the molded articles therefrom so that said articles may be carried downwardly by the die-part 14 to be dislodged from it by the knock-out pins 50, 50.

While I have provided the above described means for knocking out the molded articles, any other suitable means may be provided for this purpose if desired.

Within each die part 14 and 17 there is provided a passage 62 through which steam and water may be circulated for heating and cooling purposes. (See Figures 3, 4 and 5.)

The operation of my device will now be explained by showing how handles may be molded upon a series of putty knives 63. These knives are first placed within the half-cavities 15 of the die-part 14, underneath the free ends of the springs 43. (See Figures 3 and 5.) The water is then turned on to move the plunger 5 forwardly to raise the jaw 13 until the die-part 14 which it carries, engages the stationary die-part 17, the two die-parts forming around the handle portions of the articles complete cavities that conform to the shape of the handles now to be molded upon them. The phenolic condensation compound or other plastic material in its powdered or other form, is then placed within these cavities and steam circulated through the passages 62 to heat it. Water pressure is then applied to the plunger 33, which forces the cores 35 into the mouths of the cavities to compress the material thoroughly and forcibly upon the handle portions of the knives 63, and through holes 64 therein to provide means for firmly securing the handles upon the knives without the use of screws, rivets or other metallic elements that are driven into the handles from the outside. In Figure 6 the handle of the screw driver there shown is broken away to show a corrugation 65 that forms an anchoring element for the plastic material, while in Figure 7 the handle is broken away to show a lug 66 on the metallic portion of the umbrella handle there shown. Upon these articles, as well as numerous others, handles and other parts may be readily and effectively molded by my pincher type of press.

After the cores 35 have been withdrawn from the cavities by the plunger 37 in the cylinder 36, water pressure is applied to the return plunger 7, which withdraws the die-part 14 from engagement with its complemental die-part 17. The plungers 54, dislodge the knives from the cavities 16 in the die-part 17 after the die-part 14 starts its descent, so that said knives may be carried downwardly by it. Just before the die-part 14 reaches the limit of its descending movement, the pins 50, 50 strike the top of the upright brace 22 to cause the plungers 44 to dislodge the knives from the cavities 15 in the die-part, or to knock them out completely when no retaining springs are employed.

It will now be seen that I have devised a molding press that is extremely accessible for the insertion and withdrawal of articles upon which parts are to be molded, and which will insure quantity production on a large scale.

Having described my invention, I claim:

1. In a device of the type described, the combination with a bed, of a die-part supported upon said bed, a complemental die-part supported upon said bed, adapted to hold articles upon which parts are to be molded, means for moving the second die-part into engagement with the first die-part to provide around the article, for the reception of plastic material, a cavity conforming in shape to the part to be molded thereon, and pressure means adapted to enter said cavity to forcibly press the plastic material upon the article.

2. In a device of the type described, the combination with a bed, of a die-part supported upon said bed, a complemental die-part pivotally supported upon said bed adapted to hold articles upon which parts are to be molded, means for moving the second die-part into engagement with the first die-part to provide around the article, for the reception of plastic material, a cavity conforming in shape to the part to be molded thereon, and pressure means adapted to enter said cavity to press the plastic material forcibly upon the article.

3. In a device of the type described, the combination with a bed, of a stationary die-part supported upon said bed, a complemental die-part pivotally supported upon said bed, means for supporting the second die-part in an angular position to receive articles upon which parts are to be molded, means for holding said articles in said second die-part, means for moving the second die-part into engagement with the first die-part to provide around the article, for the reception of plastic material, a cavity conforming in shape to the part to be molded on it, and pressure means adapted to enter said cavity to press the plastic material upon the article.

4. In a device of the type described, the combination with a bed, of a stationary die-part supported upon said bed, a jaw casting pivotally supported upon said bed, a die-part carried by the upper portion of said casting, adapted to hold articles upon which parts are to be molded, a connecting rod secured to the lower part of said casting, a horizontal hydraulic cylinder, a plunger in said cylinder, to which said connecting rod is secured for moving the second die-part into engagement with the first die-part to provide between them for articles which the second die-part carries upwardly, cavities for the reception of plastic material, and pressure means adapted to enter said cavities to forcibly press the plastic material upon said articles.

5. In a device of the type described, the combination with a bed, of a stationary die-part supported upon said bed, a jaw casting pivotally supported upon said bed, a die-part carried by the upper portion of said casting, adapted to hold articles upon which parts are to be molded, means for supporting the upper portion of the jaw casting in a position to permit articles to be easily inserted in the die-part carried thereby, means for moving the upper portion of the jaw casting to bring the die-part thereon into engagement with the stationary die-part, to provide between them for articles which the second die-part carries upwardly, cavities for the reception of plastic material, and pressure means adapted to enter said cavities to forcibly press the plastic material upon said articles.

6. In a device of the type described, the combination with a bed, of a stationary die-part supported upon said bed, a jaw casting pivotally supported upon said bed, a die-part carried by the upper portion of said casting, adapted to hold articles upon which parts are to be molded, a member on said bed, for supporting the upper portion of the jaw casting in a position to permit articles upon which parts are to be molded, to be easily inserted in the die-part which it carries, means for moving the upper portion of said jaw casting above said member to bring the die-part carrying said articles, into engagement with the stationary die-part to provide around the articles, cavities conforming in shape to the parts to be molded thereon, and pressure means adapted to enter said cavities to forcibly press the plastic material upon said articles.

7. In a device of the type described, the combination with a bed, of a die-part supported upon said bed, a complemental die-part movable into engagement with the first die-part to form therewith, mold cavities, pressure means adapted to enter said mold cavities, and plunger means for automatically knocking the molded articles out of said cavities when the second die-part is moved away from the first.

8. In a device of the type described, the combination with a bed, of a die-part supported upon said bed, a complemental die-part movable into engagement with the first die-part to form therewith, mold cavities, pressure means adapted to enter said cavities, plungers movable into said cavities from the stationary die part, and automatic means for forcing said plungers into the mold cavities to dislodge the molded articles therefrom when the second die-part is moved away from the first.

9. In a device of the type described, the combination with a bed, of a die-part supported upon said bed, a complemental die-part pivotally supported on said bed adapted to receive articles upon which parts are to be molded, means for moving said second die-part from an angular position convenient to receive said articles, into engagement with the first die-part, to form molding cavities around said articles for the reception of plastic material, pressure means adapted to enter said cavities and means adapted to be engaged by the second die-part on its movement away from the first die-part to knock the molded articles out of it.

10. In a device of the type described, the combination with a bed, of a die-part supported upon said bed, a complemental die-part pivotally supported on said bed, means for supporting the latter in an angular position convenient to receive articles upon which parts are to be molded, means for moving said second die-part into engagement with the first die-part, to form molding cavities around said articles for the reception of plastic material, pressure means adapted to enter said cavities, plungers adapted to enter the cavities of the second die-part, and means for moving the plungers into said cavities to dislodge the molded articles therefrom when the second die-part reaches the means which support it in its filling position.

11. In a device of the type described, the combination with a bed, of a die-part supported upon said bed, a complemental die-part, a jaw casting pivotally supported upon said bed to carry the second die-part into engagement with the first, means for supporting that portion of the jaw casting which carries the second die-part, in a position to permit the easy insertion of articles in said die-part, means for forcing the jaw casting to a position to bring the second die-part into engagement with the first die-part, to form molding cavities around said articles for the reception of plastic material, pressure means adapted to enter said cavities, plungers adapted to enter the cavities of the second die-part, a bar to which said plungers are connected, adapted to be received in a recess in the jaw casting, and pins projecting from said recess through the casting to bring their outer ends in a position to engage the supporting means on the downward movement of the casting, to move said bar upwardly and through it force the plungers into the cavities of the second die-part to dislodge the molded articles therefrom.

12. In a device of the type described, the combination with a bed, of a stationary die-part supported upon said bed, a complemental die-part movable into engagement with the first die-part to form therewith, mold cavities, pressure means adapted to enter the latter, plungers movable into said cavities from the stationary die-part, a bar to which said plungers are secured, pins on said bar adapted to be engaged and moved inwardly by the second die-part to force the plungers out of said cavities to clear the latter for the reception of plastic material, and springs adapted to force the plungers into the cavities to dislodge the molded articles therefrom when the second die-part moves away from the first die-part.

13. In a device of the type described, the combination with a bed, of a die-part adapted to hold articles upon which parts are to be molded, supported upon said bed, a complemental die-part movable from an angular position with reference to the first die-part, into engagement with the latter to form therewith, mold cavities, and pressure means adapted to enter said mold cavities.

14. In a device of the type described, the combination with a bed, of a die-part pivotally supported upon said bed, and a complemental die-part adapted to hold articles upon which parts are to be molded, movable from a vertical position in engagement with said first die-part to a position convenient for the removal of the molded articles therefrom.

15. In a device of the type described, the combination with a bed, of a die-part pivotally supported upon said bed, and a complemental die-part adapted to hold articles upon which parts are to be molded, movable from a vertical position in engagement with the first die-part to an angular position convenient for the removal of the molded articles therefrom.

16. In a device of the type described, the combination with a bed, of a die-part pivotally supported upon said bed, and a complemental die-part adapted to hold articles upon which parts are to be molded, downwardly movable from a position in engagement with the first die-part, to an inclined position in front of the operator to permit him to readily remove the molded articles therefrom.

17. In a device of the type described, the combination with a bed, of a die-part supported upon said bed, a complemental die-part adapted to hold articles upon which parts are to be molded, downwardly movable from a position in engagement with the first die-part, and means for arresting the downward movement of the second die-part at a point convenient for the removal of the molded articles therefrom.

18. In a device of the type described, the combination with a bed, of a die-part supported upon said bed, a complemental die-part adapted to hold articles upon which parts are to be molded, downwardly movable from a position in engagement with the first die-part, and a brace projecting upwardly from said bed to arrest the downward movement of the second die-part at a point convenient for the removal of the molded articles therefrom.

In testimony whereof I have hereunto set my hand this 12th day of April, 1920.

VINCENT G. APPLE.

Witness:
  E. V. MARTIN.